United States Patent
Pfaff et al.

(10) Patent No.: US 11,499,888 B2
(45) Date of Patent: Nov. 15, 2022

(54) LENS INSPECTION MODULE

(71) Applicant: ALCON INC., Fribourg (CH)

(72) Inventors: Bernhard Pfaff, Blankenbach (DE);
Roger Biel, Aschaffenburg (DE);
Susanne Fechner, Aschaffenburg (DE);
Daniel Kessler, Lützelhausen (DE)

(73) Assignee: Alcon Inc., Fribourg (CH)

( * ) Notice: Subject to any disclaimer, the term of this patent is extended or adjusted under 35 U.S.C. 154(b) by 113 days.

(21) Appl. No.: 17/021,305

(22) Filed: Sep. 15, 2020

(65) Prior Publication Data
US 2021/0080347 A1 Mar. 18, 2021

Related U.S. Application Data (60) Provisional application No. 62/901,517, filed on Sep. 17, 2019.

(51) Int. Cl.
*G01M 11/02* (2006.01)
*B08B 5/04* (2006.01)

(52) U.S. Cl.
CPC .......... *G01M 11/0207* (2013.01); *B08B 5/04* (2013.01); *G01M 11/0278* (2013.01)

(58) Field of Classification Search
CPC ......... G01M 11/0207; G01M 11/0214; G01M 11/0278; B08B 1/008; B08B 5/04; B29D 11/00259; B29D 11/0098
See application file for complete search history.

(56) References Cited

U.S. PATENT DOCUMENTS 5,649,410 A 7/1997 Martin
5,655,252 A * 8/1997 Miyawaki ............... B08B 1/007
15/309.1

FOREIGN PATENT DOCUMENTS

| EP | 0604180 A3 | 6/1994 |
| KR | 101844505 B1 | 4/2018 |
| KR | 101982229 B1 | 5/2019 |
| WO | 2003016855 A1 | 2/2003 |
| WO | 2007042280 A1 | 4/2007 |

* cited by examiner

*Primary Examiner* — Michael A Lyons
*Assistant Examiner* — Amanda Merlino
(74) *Attorney, Agent, or Firm* — Sheng-Hsin Hu (57) ABSTRACT

A lens inspection module comprises:
a lens insertion station, at least one lens inspection station, and a lens removal station as well as a closed-loop transportation rail,
a cuvette transportation shuttle with a plurality of inspection cuvettes, and
a self-driving cleaning shuttle for cleaning the rail.
Cleaning shuttle comprises a driving unit a cleaning head, a suction unit, and a tube connecting cleaning head and suction unit. Cleaning head is spaced apart from suction unit and driving unit in the transportation direction and is pivotally arranged about a pivot axis. Cleaning head may comprise a distance sensor for detecting the distance between cleaning shuttle and transportation shuttle. Driving unit is configured to change the speed of the self-driving cleaning shuttle when the distance between the cleaning shuttle and the transportation shuttle is shorter than a predetermined threshold distance.

5 Claims, 4 Drawing Sheets

LENS INSPECTION MODULE

This application claims the benefit under 35 USC § 119 (e) of U.S. provisional application No. 62/901,517 filed 17 Sep. 2019, herein incorporated by reference in its entirety.

The present invention deals with a lens inspection module for the inspection of ophthalmic lenses, in particular contact lenses such as soft contact lenses.

In the production of ophthalmic lenses, in particular contact lenses such as soft contact lenses, the manufactured lenses are inspected for defects in a lens inspection module. By way of example, in a known production line for manufacturing soft contact lenses this inspection is performed by placing a plurality of soft contact lenses concurrently manufactured into a corresponding plurality of inspection cuvettes waiting at a lens insertion station of the lens inspection module. Inspection cuvettes suitable for this purpose are disclosed, for example, in WO 03/016855 or WO 2007/042280.

At the lens insertion station of the lens inspection module, a plurality of contact lenses to be inspected are introduced with the aid of grippers into a corresponding plurality of inspection cuvettes which are filled with a liquid (e.g. water), one lens into each cuvette. Thereafter, the said plurality of inspection cuvettes are transported together through one or more inspection stations of the lens inspection module at which the contact lenses are inspected. After inspection, those contact lenses that have successfully passed the inspection may be transferred to the packaging line at a lens removal station. Those lenses that have not successfully passed the inspection are not removed from the inspection cuvettes at the lens removal station and remain in the inspection cuvettes. The inspection cuvettes are subsequently returned along a closed-loop transportation rail back to the lens insertion station where the next plurality of contact lenses to be inspected are inserted into the corresponding plurality of inspection cuvettes again (one lens into each cuvette), and the inspection process starts anew. On the way back to the lens insertion station, the liquid contained in the cuvettes (e.g. water) is removed from the cuvettes together with any lenses that may not have passed the inspection (these lenses are disposed of), and the liquid is replaced with fresh and clean liquid prior to insertion of the next plurality of contact lenses into the inspection cuvettes.

Transportation of the inspection cuvettes along the closed-loop transportation rail may be performed with the aid of cuvette transportation shuttles. Typically, a plurality of inspection cuvettes is mounted to such cuvette transportation shuttle, and the cuvette transportation shuttle which the cuvettes arranged thereon is transported along the closed-loop transportation rail through the various stations of the inspection module. For that purpose, the shuttle must be securely arranged on the closed-loop transportation rail and safely guided during its movement along the transportation rail. This is typically achieved with the aid of rollers which are in direct mechanical contact with the transportation rail. Some of these rollers may be embodied as current collector rollers which are made from an electrically conductive material (e.g. graphite) so that they can collect the electrical power necessary for driving the cuvette transportation shuttle from electrically conductive portions of the transportation rail which are supplied with electrical power. Collection of the electrical power from the portions of the transportation rail which are supplied with electrical power occurs through the direct mechanical contact of the electrically conductive rollers with these portions.

During movement of the cuvette transportation shuttle along the transportation rail the rollers (regardless of whether or not electrically conductive) inevitably produce wear since all rollers are in direct mechanical contact with the transportation rail, and this wear deposits in the form of particles on the transportation rail so that it is necessary to clean the transportation rail from time to time.

An inspection module typically comprises a transparent housing (e.g. made of glass) to prevent dust and other debris from entering the inspection module and to maintain stable conditions, while at the same time allowing to watch and monitor the interior of the inspection module. In order now to get access to the transportation rail arranged in the interior of the inspection module to clean the transportation rail it is necessary to either remove a portion of the transparent housing or, more preferably, to open a safety door (e.g. glass door) which may be part of the transparent housing of the inspection module. In any event, production is interrupted at least as long as the safety door is open. And even once access to the closed-loop transportation rail arranged in the interior of the inspection module has been obtained, the inner surface of the closed-loop transportation rail may still be difficult to access thus further impeding the cleaning action.

It is therefore an object of the invention to overcome the afore-mentioned disadvantages and to suggest an inspection module in which cleaning of the transportation rail can be easily and reliably performed.

These and other objects are achieved by a lens inspection module according to the invention as it is specified in the independent claim. Advantageous aspects of the inspection module according to the invention are the subject of the dependent claims.

In particular, the lens inspection module for the inspection of ophthalmic lenses, in particular contact lenses such as soft contact lenses, comprises:

a lens insertion station for the insertion of the ophthalmic lenses to be inspected into inspection cuvettes, at least one lens inspection station for the inspection of the inserted ophthalmic lenses in the inspection cuvettes, a lens removal station for removal of the inspected ophthalmic lenses from the inspection cuvettes, a closed-loop transportation rail extending in a plane, with the lens insertion station, the at least one lens inspection station and the lens removal station being arranged along the closed-loop transportation rail, a cuvette transportation shuttle arranged on the closed-loop transportation rail, the cuvette transportation shuttle having a plurality of inspection cuvettes arranged thereon, for transportation of the plurality of inspection cuvettes in a transportation direction along the closed-loop transportation rail from the lens insertion station to the at least one lens inspection station, from there to the lens removal station, and back to the lens insertion station, and a self-driving cleaning shuttle for cleaning the closed-loop transportation rail, the self-driving cleaning shuttle being arranged on the closed-loop transportation rail and comprising a driving unit for moving the self-driving cleaning shuttle along the closed-loop transportation rail in the transportation direction, and further comprising a cleaning head, a suction unit, and a tube connecting the cleaning head and the suction unit, the cleaning head being arranged spaced apart from the suction unit and the driving unit in the transportation direction, and being pivotally arranged about a pivot axis extending perpendicular to the plane in which the closed-loop transportation rail extends, the cleaning head comprising at least one suction opening arranged to face the closed-loop transportation rail for removing debris from the closed-loop transportation rail and for transporting the debris to the suction unit through the tube.

Either the cleaning head or the driving unit or both comprise a distance sensor for detecting the distance between the self-driving cleaning shuttle and the cuvette transportation shuttle, the distance sensor being connected to the driving unit for providing a signal to the driving unit representing the distance between the self-driving cleaning shuttle and the cuvette transportation shuttle.

The driving unit is configured to change the speed of the self-driving cleaning shuttle when the distance between the self-driving cleaning shuttle and the cuvette transportation shuttle is shorter than a predetermined threshold distance.

In accordance with one aspect of the lens inspection module according to the invention, the self-driving cleaning shuttle further comprises a platform having a first end and a second end, the first end of the platform being pivotally connected to the cleaning head and the second end of the platform being pivotally mounted to the driving unit.

In accordance with a further aspect of the lens inspection module according to the invention, the self-driving cleaning shuttle is arranged on the closed-loop transportation rail with the cleaning head arranged at a leading end and with the driving unit arranged at a trailing end of the self-driving cleaning shuttle when viewed in the transportation direction.

In accordance with still a further aspect of the lens inspection module according to the invention, the tube has a first end and a second end, and wherein the first end of the tube is pivotally connected to the cleaning head about an axis which is parallel to the pivot axis which the cleaning head is pivotable about, and wherein the second end of the tube is fixedly connected to the suction unit.

In accordance with yet a further aspect of the lens inspection module according to the invention, the self-driving cleaning shuttle is arranged on the closed-loop transportation rail such that the cleaning head arranged at the leading end of the self-driving cleaning shuttle is arranged behind a trailing end of the cuvette transportation shuttle, and wherein the distance sensor for providing a signal to the driving unit representing the distance between the self-driving cleaning shuttle and the cuvette transportation shuttle is arranged at a front end of the cleaning head.

The lens inspection according to the invention offers a number of advantages. Obviously, the self-driving cleaning shuttle is able to clean the closed-loop transportation rail without the need for an operator or maintenance person to perform the cleaning action which may be cumbersome in particular as regards the inner surface of the transportation rail since the inner surface is not easily accessible. In addition, it is no longer necessary to interrupt production for removing the debris that has deposited on the closed-loop transportation rail since the self-driving cleaning shuttle removes the debris during operation of the production line. The self-driving cleaning shuttle performs the function of a permanently 'installed' self-driving vacuum cleaner which is moved along the closed-loop transportation rail.

The self-driving cleaning shuttle comprises a driving unit for moving the self-driving cleaning shuttle along the closed-loop transportation rail in a transportation direction, and further comprises a cleaning head, a suction unit and a tube connecting the cleaning head and the suction unit. The tube may be a semi-rigid tube and may be made from plastics, for example. The cleaning head is arranged spaced apart from the suction unit and the driving unit in the transportation direction and is pivotally arranged about a pivot axis extending perpendicular to the plane in which the closed-loop transportation rail extends. This pivotal arrangement of the cleaning head allows the self-driving cleaning shuttle to drive through the curved portions of the closed-loop transportation rail, and the transportation rail must comprise curved portions since it forms a closed loop. As the cleaning head is arranged spaced apart from the suction unit and the driving unit, at certain points in time the cleaning head drives through a curved portion of the closed-loop transportation rail while at the same time the driving unit and suction unit drive through a straight portion of the closed-loop transportation rail.

In case more than one cuvette transportation shuttle is arranged on the closed-loop transportation rail (which is typically the case), the self-driving cleaning shuttle is arranged between two of these cuvette transportation shuttles arranged on the closed-loop transportation rail (viewed in the transportation direction). For example, the cuvette transportation shuttles may be transported from one station of the lens inspection module to the next station along the closed-loop transportation rail in accordance with a given clock cycle.

To avoid that the self-driving cleaning shuttle may crash into the cuvette transportation shuttle which is arranged directly ahead of the self-driving cleaning shuttle on the closed-loop transportation rail (viewed in the transportation direction), either the cleaning head of the self-driving shuttle or the driving unit of the self-driving cleaning shuttle, or both, comprise a distance sensor. This distance sensor measures the distance between the self-driving cleaning shuttle and the cuvette transportation shuttle which is arranged directly ahead of the self-driving cleaning shuttle on the closed-loop transportation rail (viewed in the transportation direction), and provides a corresponding signal representing this distance to the driving unit. Signal transfer from the distance sensor to the driving unit may be wired (i.e. through one or more cables) or wireless. The driving unit (receiving the signals from the distance sensor) is configured to change the speed of the self-driving cleaning shuttle when the distance between the self-driving cleaning shuttle and the cuvette transportation shuttle is shorter than a predetermined threshold distance. Or to say it in other words, in case the distance between the self-driving cleaning shuttle and the cuvette transportation shuttle is getting too short the driving unit of the self-driving cleaning shuttle decelerates the speed of the self-driving cleaning shuttle or even stops the self-driving cleaning shuttle, and when the distance is above the threshold distance again, the self-driving cleaning shuttle is accelerated again.

The self-driving cleaning shuttle may comprise a platform having first and a second ends. The first end of the platform is pivotally connected to the cleaning head and the second end of the platform is pivotally mounted to the driving unit. Accordingly, the platform is pivotally connected at both of its ends. These pivotal connections are necessary to allow the driving shuttle to drive through the curved portions of the closed-loop transportation rail. Due to the rigidity of the platform the distance between the two pivotal connections always remains constant, even at the time the self-driving cleaning shuttle drives through the curved portions. However, since the direction in which the cleaning head actually moves may be different from the direction in which the driving unit actually moves (in case one of the driving unit and cleaning head moves through a curved portion of the closed-loop transportation rail while the other of the driving unit and cleaning head does not), the platform is pivotally connected to both of them.

The self-driving cleaning shuttle may be arranged on the closed-loop transportation rail with the cleaning head of the self-driving cleaning shuttle being arranged at the leading end and with the driving unit arranged at the trailing end of the self-driving cleaning shuttle when viewed in the transportation direction. This means that the cleaning head is pushed forward in the transportation direction along the closed-loop transportation rail by the driving unit arranged at the trailing end. Alternatively, it is well conceivable that the driving unit is arranged at the leading end and the cleaning head is arranged at the trailing end when viewed in the transportation direction. In this case, the cleaning head arranged at the trailing end is pulled behind by the driving unit in the transportation direction (in this case the driving unit comprises the distance sensor).

The tube connecting the cleaning head and the suction unit may also have a first end and a second end. The first end of the tube may be pivotally connected to the cleaning head about an axis which is parallel to the pivot axis about which the cleaning head is pivotable, and the second end of the tube may be fixedly connected to the suction unit. Independent from the pivotal movement of the cleaning head about the pivot axis, the first end of the tube may be pivotally connected to the cleaning head. The tube also has a fixed length, and since the second end of this tube is fixedly mounted to the suction unit, at this end of the tube there is no degree of freedom as regards the orientation of the tube relative to the suction unit. In case the cleaning head now moves through a curved portion of the closed-loop transportation rail while the suction unit (and the driving unit) are moving along a straight portion of the closed-loop transportation rail, this pivotal connection of the first end of the tube to the cleaning head allows the tube to be oriented such that any forces/tensions acting on the tube are minimized.

In case the self-driving cleaning shuttle is arranged on the closed-loop transportation rail such that the cleaning head arranged at the leading end of the self-driving cleaning shuttle is arranged behind a trailing end of the cuvette transportation shuttle (or in case of multiple cuvette transportation shuttles behind a trailing end of that cuvette transportation shuttle which is arranged directly ahead of the self-driving cleaning shuttle), the distance sensor is arranged on a front end of the cleaning head. This arrangement of the distance sensor is advantageous with respect to the 'field of view' of the distance sensor.

Further advantageous aspects of the lens inspection module of the instant invention will become apparent from the following description of embodiments of the invention with the aid of the drawings in which.

Figure 1:
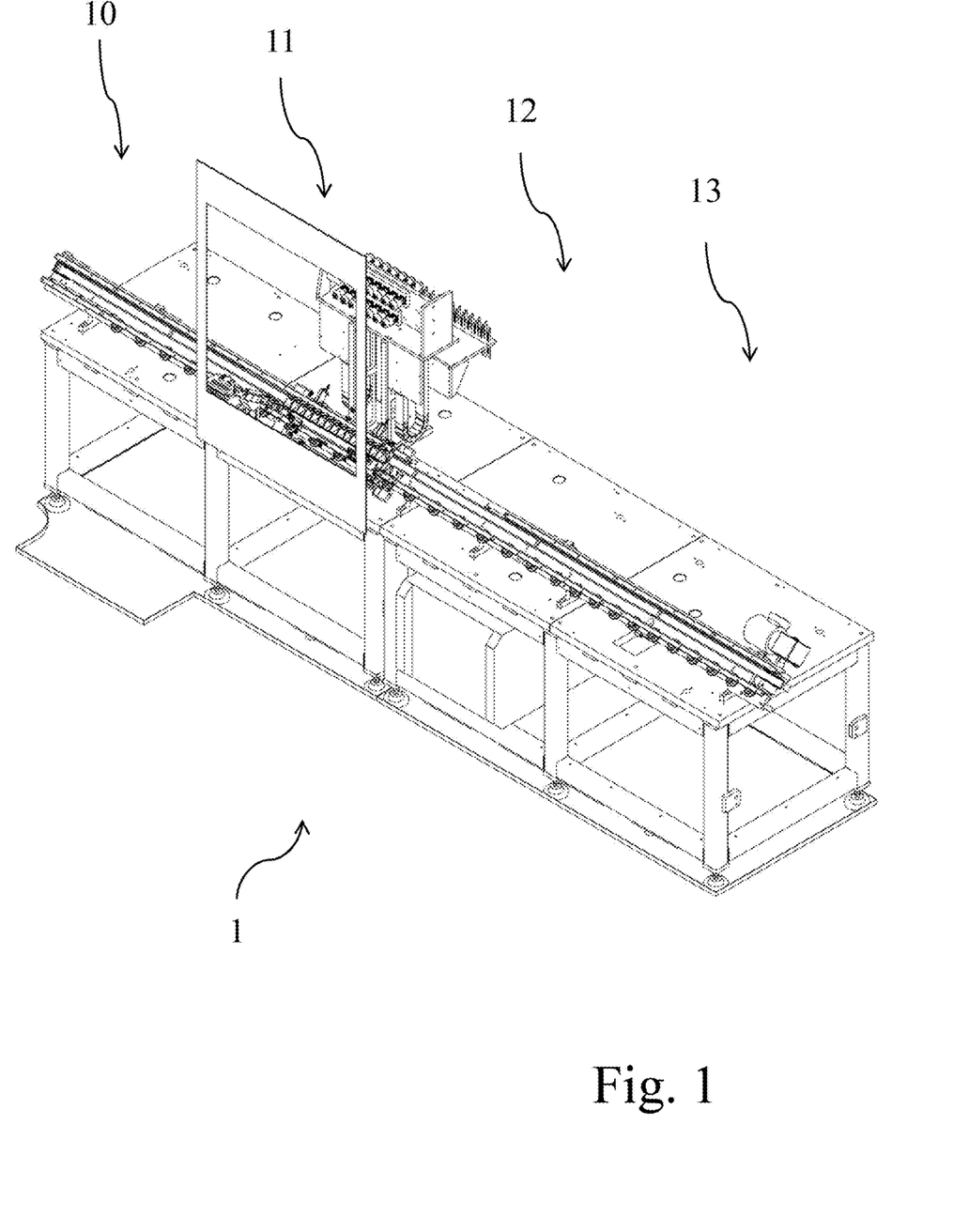
FIG. 1 shows a schematic arrangement of a number of stations in a lens inspection module.

FIG. 1 shows a schematic arrangement of a number of individual stations of a lens inspection module 1 for the inspection of ophthalmic lenses, in particular contact lenses such as soft contact lenses, without showing any details of the individual stations since such details do not form part of the instant invention. Lens inspection module 1 comprises a lens insertion station 10 in which the lenses to be inspected may be placed into inspection cuvettes containing a liquid (e.g. water). Thereafter, the inspection cuvettes containing the lenses to be inspected may be transported to one or more inspection stations such as a first inspection station 11 and a second inspection station 12. Those lenses that have successfully passed inspection may then be removed from the inspection cuvettes in a lens removal station 13 and transferred to a packaging line. The inspection cuvettes are then returned to the lens insertion station 10 where the next lenses to be inspected may be placed into the inspection cuvettes and the process starts anew. On the way back to the lens insertion station the liquid contained in the inspection cuvettes and possibly any lenses that have not passed inspection are removed from the inspection cuvettes and the cuvettes are filled with fresh liquid before the next lenses to be inspected are placed into the inspection cuvettes. All stations of the lens inspection module 1 are arranged along a closed-loop transportation rail, as will be discussed in more detail below.

Figure 2:
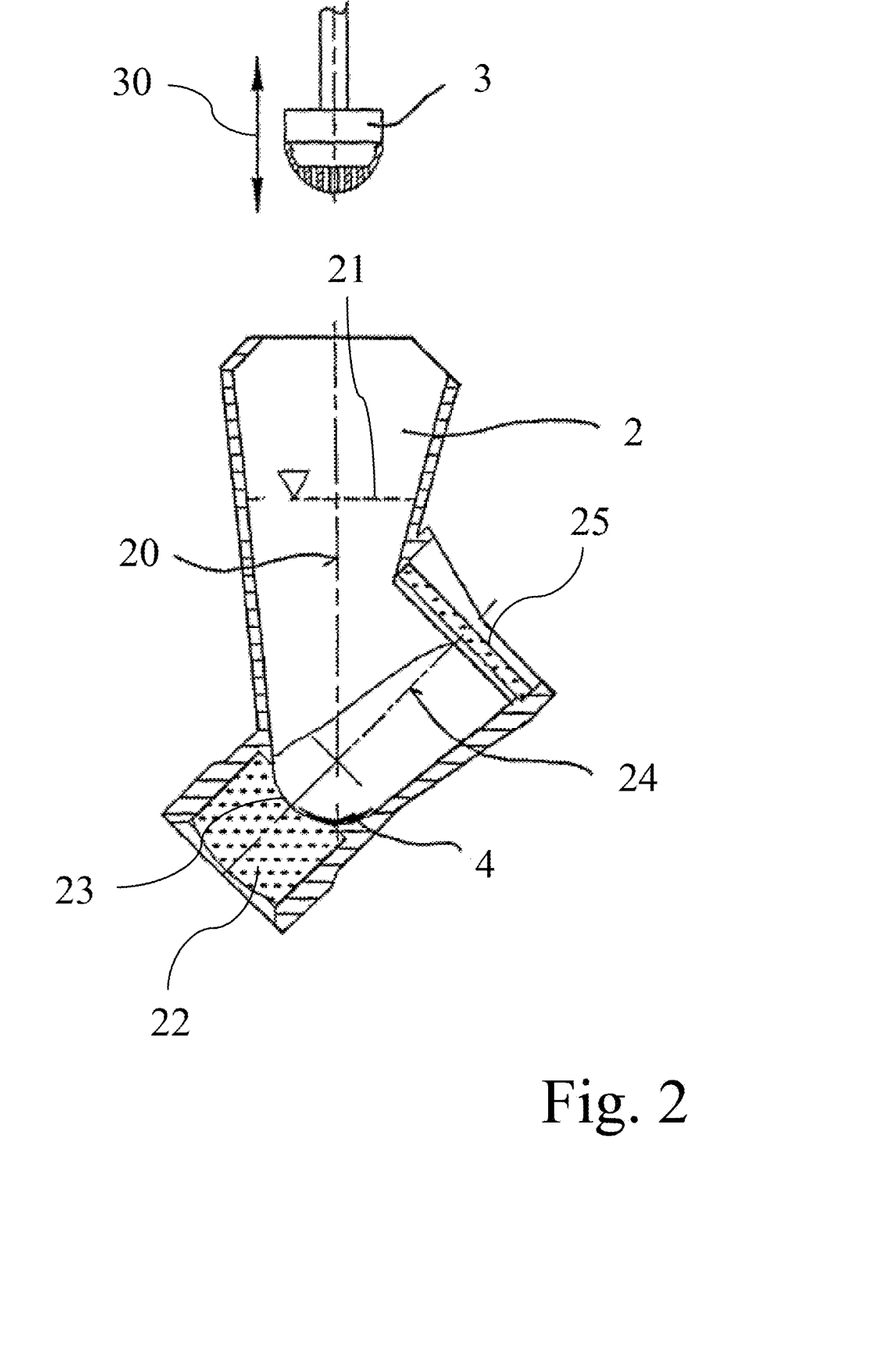
FIG. 2 shows an inspection cuvette which may be used in the lens inspection module.

As has already been mentioned further above, inspection cuvettes suitable for the inspection of the lenses are disclosed, for example, in WO 03/016855 or WO 2007/042280. One such known inspection cuvette 2 is shown in FIG. 2 in a position (axis 20 being arranged in the orientation shown in FIG. 2) in which a lens to be inspected may be placed into inspection cuvette 2 with the aid of a gripper 3 at the lens insertion station 10, or in which a lens that has successfully passed inspection may be removed from inspection cuvette 2 with the aid of gripper 3 at the lens removal station 13, as is indicated by the double-headed arrow 30. Insertion of the lens into as well as removal of the lens from inspection cuvette 2 is known in the art.

As can also be seen from FIG. 2, inspection cuvette 2 is filled with liquid (e.g. water) which is indicated by the dashed lines 21, and has a transparent bottom insert 22 having a concave inner bottom surface 23 on which the lens 4 may come to rest after having been placed into cuvette 2 (see FIG. 2). Prior to inspection of the lens 4, inspection cuvette 2 is tilted such that the axis 24 running perpendicular to viewing glass 25 is arranged in the upright position (i.e. the position of axis 20 shown in FIG. 2). The lens 4 may then be inspected through the viewing glass 25 while being fully immersed in the liquid (the level of the liquid 21 is above the level of the lower surface of viewing glass 25 so that no bubbles may negatively affect inspection). This kind of lens inspection is also known in the art.

Figure 3:
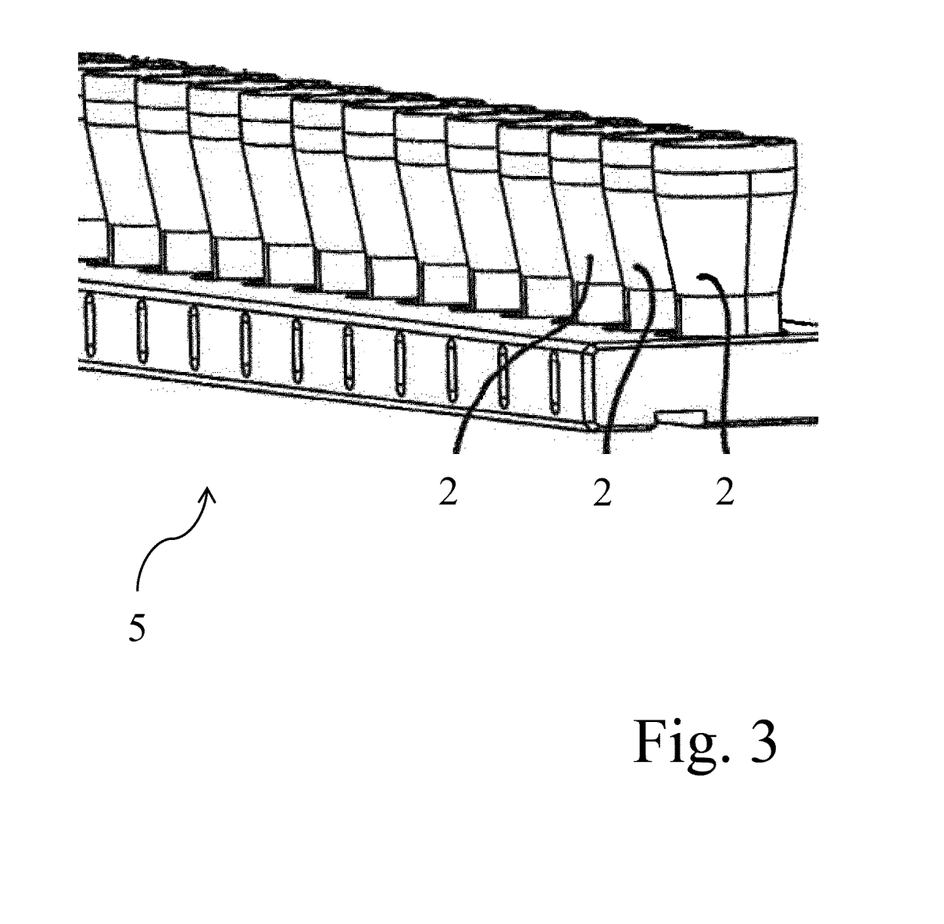
FIG. 3 shows a plurality of inspection cuvettes arranged on a cuvette transportation shuttle.

To effectively perform inspection of lenses, a plurality of inspection cuvettes 2 may be arranged on a cuvette transportation shuttle 5 which is transported through the various stations of the lens inspection module 1, as is shown in FIG. 3. This allows for a more effective mass production process in which a plurality of lenses is concurrently produced, inspected and packaged.

Transportation of the cuvette transportation shuttle 5 occurs along a closed-loop transportation rail, since after transportation through the various stations of lens inspection module 1 the inspection cuvettes 2 are returned to the lens insertion station 10 for being used again.

Figure 4:
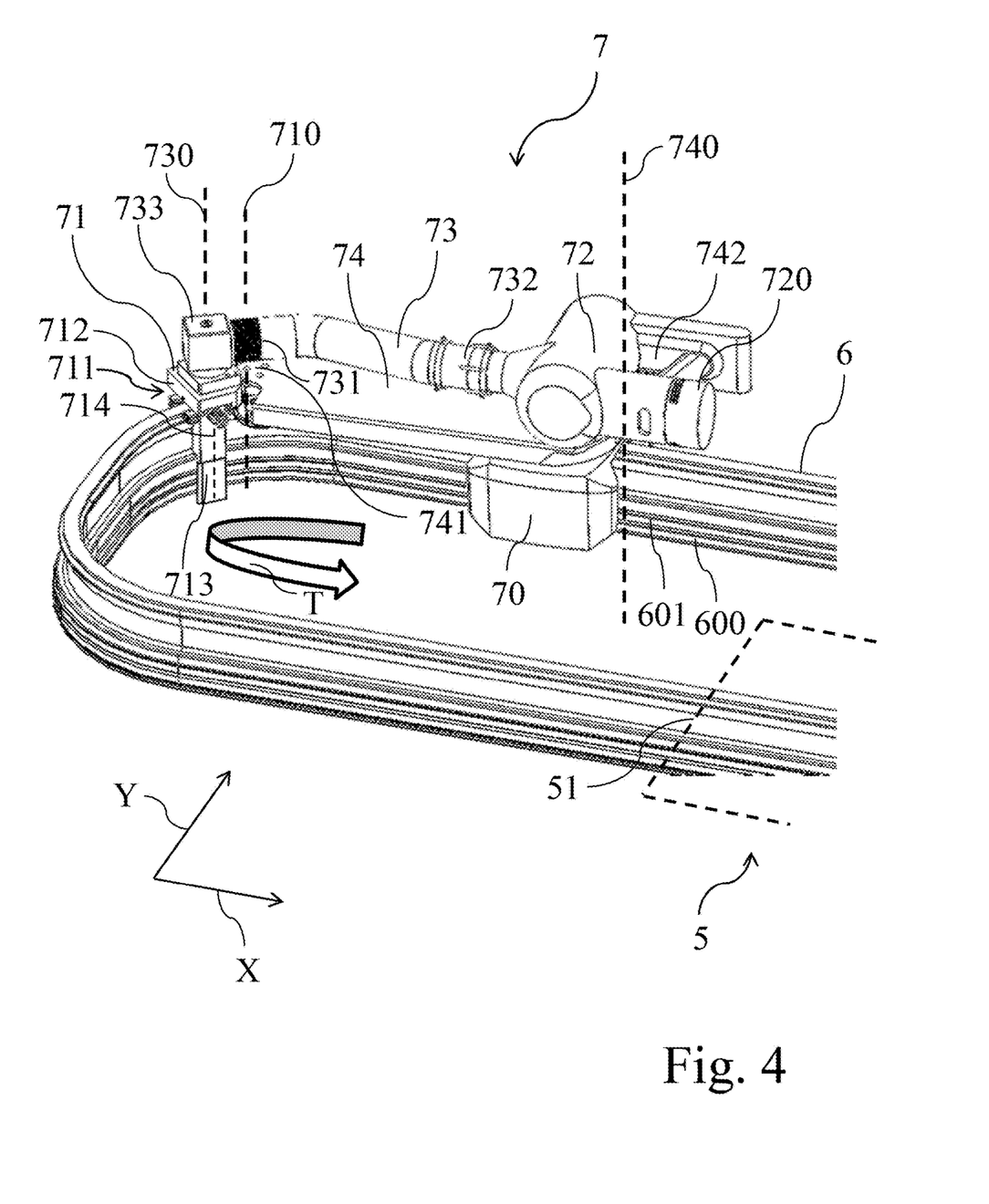
FIG. 4 shows a portion of a closed-loop transportation rail arranged in the lens inspection module with a self-driving cleaning shuttle arranged thereon and with a schematically indicated trailing end of a cuvette transportation shuttle.

FIG. 4 shows a portion of a closed-loop transportation rail 6 arranged in the lens inspection module with a self-driving cleaning shuttle 7 arranged thereon. As can be seen in FIG. 4, the closed-loop transportation rail 6 extends in a plane spanned by the arrows X and Y. Also, a trailing end 51 of a cuvette transportation shuttle 5 arranged on the closed-loop transportation rail 6 is shown in FIG. 4 in dashed lines. The transportation direction T (i.e. the direction in which the cuvette transportation shuttle 5 and the self-driving cleaning shuttle 7 are moving along the closed-loop transportation rail 6 in operation) is also indicated in FIG. 4 by an arrow. Viewed in this transportation direction T, cuvette transportation shuttle 5 is transported along the closed-loop transportation rail 6 ahead of the self-driving cleaning shuttle 7.

The cuvette transportation shuttle 5 is securely arranged and safely guided along the closed-loop transportation rail 6 with the aid of rollers, as is well-known in the art. For this purpose, these rollers are in contact with the closed-loop transportation rail 6. One or more portions of the closed-loop transportation rail 6 may be electrically conductive and may be supplied with electrical power. For example, two tracks 600, 601 on the inner surface 60 of closed-loop transportation rail 6 may be supplied with a moderate DC voltage (for example a DC voltage in the range of 12-24 volts), and current collector rollers which are made from an electrically conductive material (e.g. graphite) may engage these tracks 600, 601 to mechanically contact the tracks 600, 601 such that they can collect from the tracks 600, 601 the electrical power necessary for driving the cuvette transportation shuttle 5. In addition, cuvette transportation shuttle 5 may comprise non-conductive rollers for securely arranging and safely guiding the cuvette transportation shuttle 5. Such non-conductive rollers are typically made from rigid plastics. While the non-conductive rollers also produce wear this holds even more for the current collector rollers so that both types of rollers in operation result in particles being generated and deposited on the closed-loop transportation rail 6. In particular as regards the current collector rollers such wear deposits on the inner surface, in particular on the tracks 600 and 601, of the closed-loop transportation rail 6, and this inner surface of the closed-loop transportation rail 6 is particularly cumbersome to access.

The self-driving cleaning shuttle 7 now automatically and in-line during the production process removes these particles from the closed-loop transportation rail 6. Self-driving cleaning shuttle 7 comprises a driving unit 70 for moving the self-driving cleaning shuttle in the transportation direction T along the closed-loop transportation rail 6, and further comprises a cleaning head 71, a suction unit 72 and a tube 73 connecting cleaning head 71 and suction unit 72. Cleaning head 71 is arranged spaced apart from the suction unit in the transportation direction T.

Self-driving cleaning shuttle 7 further comprises a platform 74 having a first end 741 and a second end 742. Platform 74 may be embodied as a metal plate made which may be made from stainless steel, for example. The first end 741 of platform 74 is pivotally connected to cleaning head 71 so that cleaning head 71 is pivotable about an axis 710 perpendicular to the plane X, Y in which closed-loop transportation rail 6 extends. The second end 742 of platform 74 is pivotally connected to driving unit 70 (this being schematically indicated by axis 740). The pivotal connections of platform 74 to cleaning head 71 and to driving unit 70 render the self-driving cleaning shuttle 7 capable of driving through the curved portions of closed-loop transportation rail 6. Suction unit 72 is fixedly mounted to platform 74 and comprises a collector bin 720 for collecting the particles sucked in.

Tube 73 has a first end 731 which is pivotally connected to cleaning head 71 and a second end 732 which is fixedly connected to suction unit 72. The pivotal connection of the first end 731 of tube 73 is embodied through a connector 733 to which first end 731 of tube 73 is fixedly mounted, however, connector 733 is pivotable about an axis 730 which is parallel to pivot axis 710 so that forces and tensions acting on tube 73 can be reduced to a minimum (if not to zero) as the self-cleaning driving shuttle 7 drives through the curved portions of the closed-loop transportation rail 6. As mentioned above already, tube 73 may be a semi-rigid tube, for example tube 73 may be made from plastics and may comprise a bellows structure at the first end 731 thereof (as shown in FIG. 4) in order to provide for some flexibility as regards expansion of the tube 73 in its longitudinal direction.

Cleaning head 71 further comprises a distance sensor 711 (see the arrow in FIG. 4 pointing to the small dot in the center of front surface 712) which is arranged at a front end of cleaning head 71. In the embodiment shown in FIG. 4, distance sensor 711 is arranged in the front surface 712 of cleaning head 71. This arrangement of distance sensor 711 is advantageous as the field of view of distance sensor 711 is optimal.

Cleaning head 71 further comprises two lateral brackets, one arranged on the inside of the closed-loop transportation rail 6 and one arranged on the outside of the closed-loop transportation rail 6. Only one of the brackets 713 is visible in FIG. 4 (the other one is hidden behind the closed-loop transportation rail 6), and this bracket 713 is shown in FIG. 4 to not extend downwards across the tracks 600 and 601. However, this is for illustrative purposes only, in practice the brackets extend downwards across the tracks 600, 601 in order to be able to suck in the graphite particles deposited on the tracks 600, 601. Each of the brackets (only bracket 713 being shown) comprises suction openings in their surface facing the inner/outer surface of the closed-loop transportation rail 6. For example, such suction opening(s) may be embodied as a slot extending in the longitudinal direction of the respective bracket and extending over the entire height of the transportation rail, such slot being indicated by the dashed line 714 in FIG. 4. However, the suction opening(s) may be embodied in any other suitable conventional manner as well.

Operation of the lens inspection module will be described in the following in particular with reference to FIG. 4. As long as the distance between self-driving cleaning shuttle 7 (in the embodiment the distance between the front surface 712 of cleaning head 71 where the distance sensor 711 is arranged) and cuvette transportation shuttle 5 (in the embodiment the trailing end 51 of the cuvette transportation shuttle 5) arranged directly ahead of the self-driving cleaning shuttle 7 when viewed in transportation direction T is longer than the predetermined threshold distance, the self-driving cleaning shuttle 7 moves in the transportation direction along the closed-loop transportation rail 6 with a predetermined speed which is controlled by driving unit 70 of self-driving cleaning shuttle 7.

During movement, any particles deposited on the closed-loop transportation rail 6 are sucked in by cleaning head 71, in particular those particles deposited on the tracks 600 and 610, but also particles deposited on other portions of closed-loop transportation rail 6. This is achieved with the aid of the respective slot (dashed line 714 in FIG. 4) in the respective bracket surface facing the inner/outer surface of the closed-loop transportation rail 6. The particles sucked into the slots of the brackets (through suction supplied by suction unit 72) are then transported through connector 733 which is in fluid connection both with the slots in the brackets and with first end 731 of tube 73, and further through tube 73 towards suction unit 72 and into collector bin 720. Thus, any particles deposited on the closed-loop transportation rail 6 can be removed from closed-loop transportation rail 6 without interruption of production, i.e. they can be removed from the rail in-line during operation of the production line. When collector bin 720 is full it must be emptied or replaced which is a quick an easy procedure that does not take long, so that the time period during which production must be interrupted (for emptying or replacing bin 720) is only short.

As self-driving cleaning shuttle 7 moves along closed-loop transportation rail 6 in transportation direction T, the cleaning head 71 at some time reaches the curved (return) portion of closed-loop transportation rail 6 shown on the left hand side in FIG. 4. Accordingly, cleaning head 71 changes its direction of movement while driving unit 70 as well as platform 74 continue to move in the direction along the straight portion of closed-loop transportation rail 6 that leads to the curved (return) portion. Therefore, cleaning head 71 connected to first end 741 of platform 74 pivots about pivot axis 710.

As self-driving cleaning shuttle 7 continues to move along the closed-loop transportation rail 6 platform 74 must also pivot relative to the driving unit 70, since the distance between the pivotal connection of platform 74 and cleaning head 71 at the first end 741 of platform 74 and the pivotal connection (pivot axis 740) of platform 74 and driving unit 70 at the second end 742 of platform 74 (not shown) is always the same and corresponds to a straight line between these two pivotal connections.

The second end 732 of the tube 73 is fixedly connected to the suction unit 72, and tube 73 has a fixed length. The first end 731 of tube 73 is fixedly connected to connector 733, however, connector 733 is pivotally connected to cleaning head 71 in order to allow connector 733 to pivot about an axis 730 which is parallel to pivot axis 710 that allows cleaning head 71 to pivot relative to platform 74. Through this pivotal connection of connector 733 to cleaning head 71, tensions and forces acting on tube 73 can be reduced or completely avoided.

Let us now assume that the cuvette transportation shuttle 5 stops (for whatever reason). For example, the cuvette transportation shuttle 5 may stop in an inspection station 11 or 12, see FIG. 1, due to an inspection of the lenses contained in the cuvettes arranged on cuvette transportation shuttle 5 being performed. Self-driving cleaning shuttle 7 continues to move with the predetermined speed. In FIG. 4 this would mean that the trailing end 51 of the cuvette transportation shuttle 5 remains at the location shown in FIG. 4 while the self-driving cleaning shuttle 7 moves towards the trailing end 51 of cuvette transportation shuttle 5 through the curved (return) portion of the closed-loop transportation rail 6 until cleaning head 71 moves along that straight portion of closed-loop transportation rail 6 where cuvette transportation shuttle 5 is located. When the distance between the front surface 712 of cleaning head 71 (where distance sensor 711 is arranged) and the trailing end 51 of cuvette transportation shuttle 5 is below a predetermined threshold distance, a corresponding signal is generated by distance sensor 711 which is provided to driving unit 70 (through a wired or a wireless connection). Driving unit 70 then causes self-driving cleaning shuttle 7 to decelerate (brake), and in case the distance continues to decrease driving unit 70 may cause self-driving cleaning shuttle 7 to stop in order to avoid crashing into cuvette transportation shuttle 5. As cuvette transportation shuttle 5 is moved again in the transportation direction T, the distance increases again and once the distance is above the threshold distance again, driving unit 70 will cause self-driving cleaning shuttle 7 to move again. A suitable driving unit 70 for this purpose is the driving unit MONTRAC® SHUTTLE MSH4 which is available from the company montratec GmbH, Johann-Liesenberger-Strasse 7, 78078 Niedereschach, Germany.

While an embodiment of the invention has been described with the aid of the drawings, the invention is not limited to this embodiment but is intended to cover a plurality of changes and modifications without departing from the teaching underlying the invention. Just to mention one such modification, it is well conceivable that self-driving cleaning shuttle 7 is arranged on the closed-loop transportation rail 6 in the reverse order when viewed in transportation direction T, i.e. with the driving unit 70 arranged at the leading end. In this case, a distance sensor may be arranged at the front end of the driving unit 70 (which corresponds to the rear end of driving unit 70 given the transportation direction T shown in FIG. 4). Generally, distance sensors may be provided both on the front end of cleaning head 71 as well as on the rear end of driving unit 70 (given the orientation and transportation direction T of the shuttle shown in FIG. 4), so that the self-driving cleaning shuttle 7 is capable of operating either with the cleaning head 71 at the leading end or with the driving unit 70 at the leading end when viewed in transportation direction T. Other modifications which are in line with the teaching underlying the invention are also comprised by the scope of protection which is defined by the appended claims.

The invention claimed is:

1. Lens inspection module (1) for the inspection of ophthalmic lenses, comprising:
   - a lens insertion station (10) for the insertion of the ophthalmic lenses to be inspected into inspection cuvettes,
   - at least one lens inspection station (11, 12) for the inspection of the inserted ophthalmic lenses in the inspection cuvettes,
   - a lens removal station (13) for removal of the inspected ophthalmic lenses from the inspection cuvettes,
   - a closed-loop transportation rail (6) extending in a plane (X, Y), with the lens insertion station (10), the at least one lens inspection station (11, 12) and the lens removal station (13) being arranged along the closed-loop transportation rail (6),
   - a cuvette transportation shuttle (5) arranged on the closed-loop transportation rail (6), the cuvette transportation shuttle (5) having a plurality of inspection cuvettes (2) arranged thereon, for transportation of the plurality of inspection cuvettes (2) in a transportation direction (T) along the closed-loop transportation rail (6) from the lens insertion station (10) to the at least one lens inspection station (11, 12), from there to the lens removal station (13), and back to the lens insertion station (10), and
   - a self-driving cleaning shuttle (7) for cleaning the closed-loop transportation rail (6), the self-driving cleaning shuttle (7) being arranged on the closed-loop transportation rail (6) and comprising a driving unit (70) for moving the self-driving cleaning shuttle (7) along the closed-loop transportation rail (6) in the transportation direction (T), and further comprising a cleaning head (71), a suction unit (72), and a tube (73) connecting the cleaning head (71) and the suction unit (72),
     the cleaning head (71) being arranged spaced apart from the suction unit (72) and the driving unit (70) in the transportation direction (T), and being pivotally arranged about a pivot axis (710) extending perpendicular to the plane (X, Y) in which the closed-loop transportation rail (6) extends, the cleaning head (71) comprising at least one suction opening (714) arranged to face the closed-loop transportation rail (6) for removing debris from the closed-loop transportation rail (6) and for transporting the debris to the suction unit (72) through the tube (73), wherein either the cleaning head (71) or the driving unit (72) or both comprise a distance sensor (711) for detecting the distance between the self-driving cleaning shuttle (7) and the cuvette transportation shuttle (5), the distance sensor (711) being connected to the driving unit (70) for providing a signal to the driving unit (70) representing the distance between the self-driving cleaning shuttle (7) and the cuvette transportation shuttle (5), and wherein the driving unit (70) is configured to change the speed of the self-driving cleaning shuttle (7) when the distance between the self-driving cleaning shuttle (7) and the cuvette transportation shuttle (5) is shorter than a predetermined threshold distance.

2. Lens inspection module according to claim 1, wherein the self-driving cleaning shuttle (7) further comprises a platform (74) having a first end (741) and a second end (742), the first end (741) of the platform (741) being pivotally connected to the cleaning head (71) and the second end (742) of the platform being pivotally mounted to the driving unit (70).

3. Lens inspection module according to claim 1, wherein the self-driving cleaning shuttle (7) is arranged on the closed-loop transportation rail (6) with the cleaning head (71) arranged at a leading end and with the driving unit (70) arranged at a trailing end of the self-driving cleaning shuttle (7) when viewed in the transportation direction (T).

4. Lens inspection module according to claim 1, wherein the tube (73) has a first end (731) and a second end (732), and wherein the first end (731) of the tube (73) is pivotally connected to the cleaning head (71) about an axis (730) which is parallel to the pivot axis (710) which the cleaning head (71) is pivotable about, and wherein the second end (732) of the tube (73) is fixedly connected to the suction unit (72).

5. Lens inspection module according to claim 3, wherein the self-driving cleaning shuttle (5) is arranged on the closed-loop transportation rail (6) such that the cleaning head (71) arranged at the leading end of the self-driving shuttle (7) is arranged behind a trailing end of the cuvette transportation shuttle (5), and wherein the distance sensor (711) for providing a signal to the driving unit (70) representing the distance between the self-driving cleaning shuttle (7) and the cuvette transportation shuttle (5) is arranged at a front end of the cleaning head (71).

* * * * *